June 3, 1941.  J. H. POWERS  2,244,373

FLUID FLOW RESPONSIVE SWITCHING DEVICE

Filed Jan. 14, 1939

Inventor:
James H. Powers,
by *Harry E. Dunham*
His Attorney.

Patented June 3, 1941

2,244,373

UNITED STATES PATENT OFFICE 2,244,373

FLUID FLOW RESPONSIVE SWITCHING DEVICE

James H. Powers, Fort Wayne, Ind., assignor to General Electric Company, a corporation of New York Application January 14, 1939, Serial No. 250,976

10 Claims. (Cl. 200—81)

The present invention relates to fluid flow responsive devices and more particularly to improvements in fluid flow responsive electric switching or circuit controlling devices.

It has been my observation, as the result of considerable investigation, that devices of this general nature, as heretofore proposed and constructed, have not had the required accuracy and sensitivity of response for certain applications such as, for example, employment in circuit control mechanism for waste disposal apparatus as proposed in my copending application Serial No. 250,975, filed January 14, 1939, and assigned to the assignee of the present invention.

A principal object of the present invention is therefore the provision of an improved form of fluid flow responsive electric switching device, of simple and economical design, which is adjustable to give accurate response to rate of flow over a wide range of flow conditions and which at the same time has a high degree of sensitivity of response to slight changes in rate of flow so as to be adjustable to operate critically on any predetermined desired flow.

Figure 1:
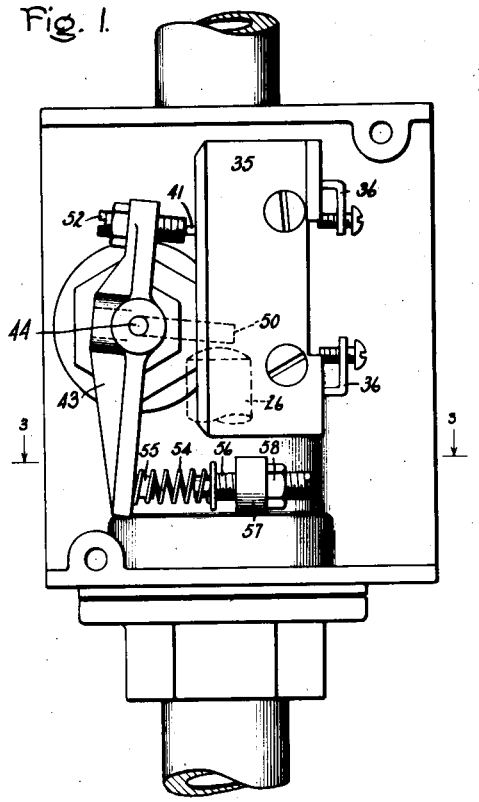
Figure 2:
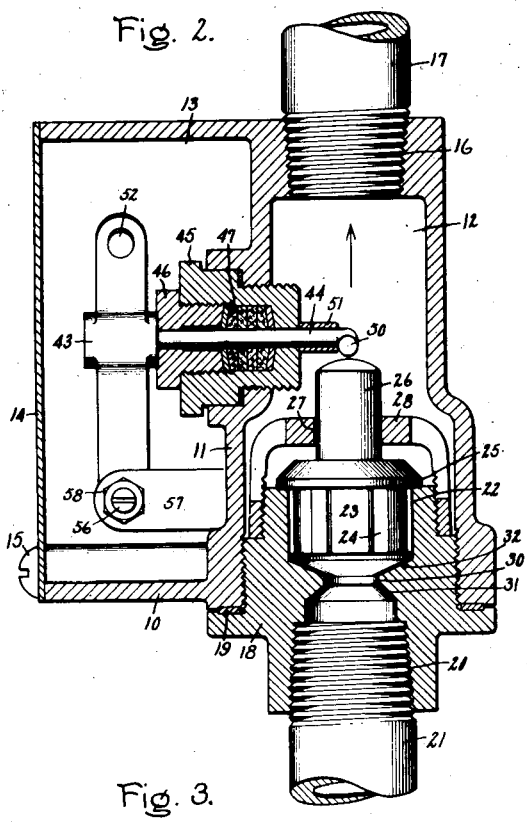
Figure 3:
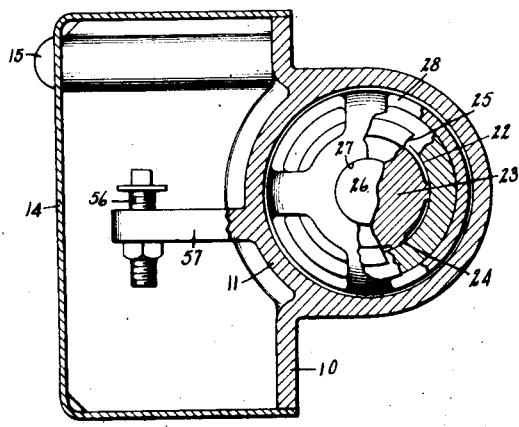
Figure 4:
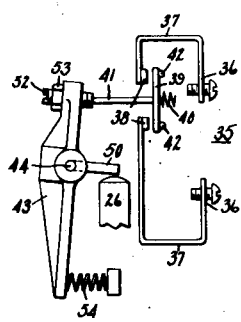

A more complete understanding of that which I consider to be novel and my invention will be given by the following detailed description and the claims appended thereto, taken in conjunction with the accompanying drawing in which Fig. 1 is a side view of an exemplary form of flow responsive device embodying the invention; Fig. 2 is a sectional elevation of the device of Fig. 1 showing in detail the construction and arrangement of the internal parts thereof; Fig. 3 is a section along the line 3—3 of Fig. 1, and Fig. 4 illustrates diagrammatically the relationship of the principal parts of the switch employed in the device of Fig. 1.

Though the exemplary device illustrated is shown as being arranged for flow of fluid vertically upward therethrough, it is suitable, as will become apparent hereinafter, for mounting and will operate in an equally satisfactory manner in any position found most convenient for the installation in which it is to be employed. As will be seen by reference to the drawing, the housing 10 of the device is divided by partition 11 into two compartments, one of which, designated 12, serves as a flow chamber and the other of which, designed 13, provides an enclosure for a switch and actuating mechanism therefor. This latter compartment is closed by a cover 14 held removably in place by screws 15.

At the upper end of flow chamber 12 is a screw-threaded outlet port 16 for connection with an outlet pipe, partially indicated at 17, of a fluid line. The lower end of chamber 12 is closed by a screw-threaded nipple 18 and suitable packing means, indicated at 19. In the outer end of nipple 18 is a screw-threaded inlet port 20 for connection with an inlet pipe, partially shown at 21. In the inner end of nipple 18 is a cylindrical valve seat 22 which opens into chamber 12 and which is arranged slidably to accommodate the body portion of a flow actuable element in the form of a plunger, generally designated 23. The periphery of the body portion of this plunger is provided with a plurality of longitudinally extending ribs 24 arranged to bear against the wall of valve seat 22 so as to steady and guide the plunger. The spaces intermediate these ribs serve as clearances for passage of fluid around the plunger and preferably are of sufficient depth to insure against clogging of the clearances by scale and other solid particles. Extending circumferentially around the plunger is a skirt or flange 25 arranged to rest on the rim of valve seat 22 when no fluid is flowing. The plunger has an extension or stem 26 which projects into chamber 12 and is accommodated and slidably guided by a centrally located opening 27 in a spider 28 screw-threaded on the inner end of nipple 18. Thus the plunger is doubly guided for axial movement in a direction longitudinally of chamber 12 and the extent of its movement into chamber 12 is limited by the spider.

Formed in nipple 18 and interconnecting inlet port 20 with the base of valve seat 22 is a passage which includes an orifice 30 of substantially less diameter than both the inlet port and the valve seat. On the approach side of this orifice the connecting passage converges, as indicated at 31, while on the discharge side of the orifice the passage expands conically, as indicated at 32, to the base of valve seat 22. Thus the orifice is operative in the manner of a nozzle to discharge a relatively high velocity stream against the base of plunger 23. Such a stream, as it is diverted outwardly to flow around the plunger, tends to exert a wedgelike action on the base of the plunger due to the conical shape of the portion 32 of the connecting passage. Due to this wedging action and the dynamic pressure of the stream discharged from orifice 30, together with the friction of the flow around the plunger and any difference in static pressure which may exist on opposite sides of the plunger, the plunger is actuated in the direction of the arrow by fluid flow.

In compartment 13 is mounted a switch, generally designated 35, which may be of any suitable form, but which preferably is of the type known to the trade as a "Micro-switch" and requiring only very small differentials of movement of its switch operating element to effect opening and closing of the switch contacts. Since the details of this switch do not form part of the present invention, it is believed sufficient for an understanding of the invention to explain the operation of the switch on the basis of a diagrammatic illlustration of the relationship of the principal parts thereof, as shown in Fig. 4. The switch has terminals 36 for connection in an electric circuit, and these terminals are connected, by means of conductors 37, with contacts 38 disposed interiorly of the switch casing. These contacts are arranged to be bridged by switch element 39 which is biased for movement to circuit closing position by means of a compression spring indicated at 40. Switch element 39 is movable to open circuit position by inwardly directed pressure on the outer end of switch actuating plunger 41, and suitable stops, indicated at 42, limit the open circuit movement of element 39. In the preferred form of switch, opening and closing of the contacts thereof is effected by differentials of movement of element 39 in the order of only a few thousandths of an inch.

For controlling the operation of switch 35, there is provided a lever 43 which is mounted on the outer end of a shaft 44, for pivotal movement in compartment 13. As best shown in Fig. 2, shaft 44 extends through partition 11 into flow chamber 12 and is supported and sealed by means of a nipple 45, packing nut 46, and suitable packing means, generally indicated at 47. Fixedly mounted on the inner end of shaft 44 and extending at right angles thereto is an arm 50 arranged to be engaged by stem 26 of plunger 23. In order properly to position arm 50 for engagement by stem 26, shaft 44 is restrained from longitudinal movement by engagement of the hub of external lever 43 with the outer face of packing nut 46, and also by a sleeve 51 disposed on shaft 44 intermediate arm 50 and the inner face of nipple 45.

The upper end of lever 43 carries an adjustable screw 52 and locking nut 53 therefor, which screw is arranged to bear against the outer end of actuating plunger 41 of switch 35. At the lower end of lever 43 is a compression spring 54, one end of which engages a guide boss 55 on the lever and the other end of which spring engages the end of a screw 56 adjustably carried by a fixed support 57 carried by housing 10. Adjustment of this spring may be effected by screw 56 and lock nut 58. The spring tends to effect rotation of lever 43 in a clockwise direction, as viewed in Fig. 1, so as to cause screw 52 to press inwardly on switch actuating plunger 41. When the force of spring 54 predominates over forces tending to rotate lever 43 in a counterclockwise direction, the pressure exerted by screw 52 on plunger 41 is effective to maintain switching element 39 in open circuit position. The extent of clockwise rotation of lever 43 is limited by engagement of switch element 39 with stops 42, and the position of lever 43, and thereby of shaft 44 and arm 50, is adjustable by screw 52. Ordinarily this adjustment is made such that, with no flow of fluid through chamber 12, there will be a slight clearance between the end of lever 50 and stem 26, as indicated in the drawing. With this arrangement, upon initiation of flow through the fluid line in which the flow responsive device is connected, plunger 23 may move sufficiently to permit flow of fluid through valve seat 22 without engagement of stem 26 with arm 50. However, under some conditions it may be necessary to adjust the position of lever 43 so that arm 50 will engage stem 26 even when plunger 23 is completely seated in the valve seat. Under these circumstances, pressure will be exerted on arm 50 by stem 26 immediately upon initiation of flow through the fluid system.

When flow of fluid through the system is initiated, as by opening a valve connected with outlet pipe 17, the difference in static pressure on opposite sides of plunger 23 causes movement of the plunger to open the valve seat and permit flow of fluid therethrough. Thereupon the pressure exerted by the flow directed from orifice 30 becomes effective to actuate the plunger. The plunger moves into engagement with arm 50 to exert force thereon, or immediately starts to exert such force if no clearance is provided between arm 50 and stem 26 as previously suggested. As the rate of fluid flow increases, the force exerted on the plunger by the fluid flow, and therefore the force exerted by stem 26 on arm 50 tending to rotate the lever system, increases. Due to the structure of the device this increase in force bears a very close relation to the increase in rate of flow. So long as the force exerted by spring 54 predominates, lever 43 will not rotate to release plunger 41. However, when the flow through the device reaches a certain rate, the force exerted by the plunger against arm 50 will overcome the counterforce exerted by spring 54 and produce counterclockwise rotation of lever 43 to release plunger 41, thereby permitting movement of switch element 39 to circuit closing position under the influence of spring 40. Through adjustment of spring 54 by means of screw 56, the operation of the lever system for closure of the contacts of switch 35 may be rendered very accurately responsive to a certain predetermined minimum flow of fluid.

As is well known to those skilled in the art, the dynamic pressure exerted by a fluid discharge from an orifice or nozzle against a solid object in the path of the discharge varies as the square of the velocity and therefore as the square of the volume in case of a fixed orifice. Thus the provision of the orifice 30 magnifies the response of plunger 23 to variations in the rate of flow. By reason of this important feature of my invention, the operation of the plunger, and the force exerted thereby tending to effect rotation of the lever system, is very sensitive to small variations in rate of flow. As a result of this, a slight drop in flow below the predetermined desired minimum will permit the force of spring 54 to predominate and cause rotation of lever 43 so as to actuate plunger 41 to open the contacts of switch 35. This is a very desirable feature in installations where it is required that a circuit controlling operation be very critically responsive to a predetermined rate of fluid flow.

From the foregoing it will be seen that I have provided a flow responsive switching mechanism which not only may be adjusted to give very accurate response to predetermined rates of flow, but also is extremely sensitive to slight variations in the rate of flow. In order to adapt the invention for various conditions which may be encountered, it is contemplated that there will suggest themselves to those skilled in the art modifications of the details of the exemplary device disclosed. It is to be understood, however, that it is intended that such modifications as do not depart from the basic principles of the invention shall come within the spirit and scope of the appended claims.

What I claim as new and desire to secure by Letters Patent of the United States, is:

1. In a flow responsive device for connection in a liquid flow line, a housing defining a flow chamber and having inlet and outlet ports designed for connection respectively with conduits of a liquid flow line, an electric switch isolated from the liquid flow passages of said housing, a valve seat having its discharge end opening into said chamber and its inlet end connected with said inlet port by a passage including an orifice of substantially less cross-sectional area than the inlet end of said valve seat, a flow actuable plunger having a body portion seated in and slidably guided by said valve seat, said orifice being in alignment with said valve seat and in spaced opposition to the inlet side of said plunger so as to be operative under predetermined liquid flow conditions to direct a relatively high velocity discharge of liquid against the inlet side of the plunger in a manner to cause movement of the plunger in the direction of said chamber, switch actuating mechanism operable responsively to movement of said plunger for effecting operation of said switch, and adjustable means to oppose flow actuated movement of the plunger in the direction of said chamber.

2. In a flow responsive device for connection in a liquid flow line, a housing defining a flow chamber and having inlet and outlet ports designed for connection respectively with conduits of a liquid flow line, an electric switch isolated from the liquid flow passages of said housing, a valve seat having its discharge end opening into said chamber and its inlet end connected with said inlet port by a passage including an orifice of substantially less cross-sectional area than the inlet end of said valve seat, a flow actuable plunger having a solid body portion seated in and slidably guided by said valve seat, said orifice being in alignment with the valve seat so as to be operative under predetermined liquid flow conditions to direct a relatively high velocity discharge of liquid against the base of said plunger in a manner to cause movement of the plunger in the direction of said chamber, switch actuating mechanism including a shaft extending through a wall of said housing and rotatable in one direction by flow actuated movement of said plunger in the direction of said chamber, and spring means connected to bias said shaft for rotation in the opposite direction.

3. In a flow responsive device for connection in a liquid flow line, the combination with electric switching means, of a housing defining a flow chamber and having inlet and outlet ports designed for connection respectively with conduits of a liquid flow line, means defining a valve seat having its discharge end opening into said chamber and its inlet end connected with said inlet port by a passage including an orifice of substantially less cross-sectional area than the inlet end of the valve seat, a flow actuable plunger seated in said valve seat for movement in the direction of said chamber, said orifice being in alignment with said valve seat and in close spaced opposition to the base of the plunger so as to direct a relatively high velocity discharge of liquid against the base of the plunger, said passage providing a generally conical converging approach to the inlet side of said orifice and expanding relatively abruptly from the discharge side of the orifice to the inlet end of said valve seat, and means operable dependently upon flow responsive movement of said plunger for controlling the operation of said switching means.

4. In a flow responsive device, the combination with electric switching means, of a housing defining a flow chamber and having inlet and outlet ports for connection in a fluid line, means defining a substantially cylindrical valve seat opening axially at one end into said chamber and connected at the other end with said inlet port, a flow actuable plunger having a solid body portion seated in and slidably guided by said valve seat for movement in the direction of said chamber in response to flow of fluid through said housing, said plunger having a circumferentially extending flange arranged to rest on a rim portion of said valve seat defining means adjacent said one end of the valve seat when no fluid is flowing, said body portion of the plunger having a plurality of longitudinally extending grooves around the periphery thereof to facilitate flow of fluid between said body portion and the walls of said valve seat, and means operable dependently upon movement of said plunger for controlling the operation of said switching means.

5. A flow responsive device including in combination, a casing defining a flow chamber and having at one end thereof means defining an outlet port communicating with said chamber and adapted for connection with an outlet pipe, a connection nipple at the other end of said casing having an inlet port formed therein for connection with an inlet pipe, said nipple being formed also with a valve seat opening at one end into said chamber and connected at the other end with said inlet port by a passage formed in the nipple, which said passage includes an orifice in axial alignment with said valve seat, a flow actuable plunger slidably seated in said valve seat for movement in the direction of said chamber in response to fluid flow through said casing, switching means supported exteriorly of said chamber, and means operable dependently upon movement of said plunger for controlling the operation of said switching means.

6. A flow responsive device including in combination, a casing defining a flow chamber and having at one end thereof means defining an outlet port communicating with said chamber and adapted for connection with an outlet pipe, a connection nipple at the other end of said casing having an inlet port formed therein for connection with an inlet pipe, said nipple being formed also with a valve seat opening at one end into said chamber and connected at the other end with said inlet port by a passage formed in the nipple, a flow actuable plunger having a body portion slidably seated in said valve seat and having an extension projecting into said chamber, said plunger being movable responsively to flow of fluid through said casing, a spider mounted on the inner end of said nipple and having means for slidably receiving and guiding said plunger extension, switching means supported exteriorly of said chamber and means operable dependently upon movement of said plunger for controlling the operation of said switching means.

7. In a flow responsive device, a housing having a passage for flow of fluid therethrough and means for connecting said passage in a fluid line, a plunger guided for movement longitudinally in said passage and actuable by flow of fluid in the passage, means for rendering the movement of said plunger closely responsive to variations in rate of fluid flow, a rotatable shaft extending laterally of said passage through a wall of said housing, a lever mounted on said shaft interiorly of said passage and engageable by said plunger for rotation of the shaft, a second lever mounted on the shaft exteriorly of said passage and having a spring connected therewith for opposing rotation of the shaft and levers by said plunger, electric switching mechanism mounted exteriorly of said passage and arranged for actuation to a circuit opening position by said second lever, and means for biasing said switching mechanism to circuit closing position, said second lever under the predominating influence of said spring being operative to maintain said switching mechanism in circut opening position and said spring being adjustable to allow rotation of said shaft and levers by said plunger to release said switching mechanism for movement of the latter to circuit closing position only upon occurrence of a predetermined minimum flow of fluid through said passage.

8. A flow responsive device including in combination, a casing defining a flow chamber and having means providing an outlet port communicating with said chamber and designed for connection with an outlet pipe, a connection nipple secured to said casing and formed with an inlet port designed for connection with an inlet pipe, said nipple also being formed with a valve seat connected with said inlet port and opening into said chamber, a flow actuable plunger slidably seated in said valve seat for movement in the direction of said chamber in response to flow of fluid in said casing, switching means isolated from the flow passages of said casing, and means operable dependently upon movement of said plunger for controlling the operation of said switching means.

9. In a flow responsive device, a housing defining a flow chamber and having means for connecting said chamber in a fluid line, said means including a valve seat on the inlet side of and opening into said chamber, a flow actuable member having a body portion obstructing said valve seat and arranged for actuation in the direction of said chamber by flow of fluid through said housing, electric switching means disposed exteriorly of said chamber, a rotatable shaft extending laterally through a wall of said housing into said chamber and having a lever mounted thereon interiorly of the chamber, said lever being mechanically disconnected from said flow actuable member but arranged for engagement by said member to effect rotation of said shaft, and a second lever mounted on said shaft exteriorly of said chamber and operable to effect operation of said switching means, said shaft and levers being rotatable in one direction by flow actuated movement of said member and being biased for rotation in the opposite direction.

10. In a flow responsive device, a housing having a passage for flow of fluid therethrough and means for connecting said passage in a fluid line, a flow actuable member disposed in said passage, a switch disposed exteriorly of the passage and including a contact biased to closed circuit position, and switch actuating mechanism biased to maintain said contact in open circuit postion, said mechanism being operative to release said contact, for movement of the latter to closed circuit position, in response to a predetermined flow actuated movement of said flow actuable member.

JAMES H. POWERS.